United States Patent
Deplazes et al.

(10) Patent No.: US 6,973,998 B2
(45) Date of Patent: Dec. 13, 2005

(54) DOOR STATE MONITORING BY MEANS OF THREE-DIMENSIONAL SENSOR

(75) Inventors: Romeo Deplazes, Oberrueti (CH); Elena Cortona, Thalwil (CH)

(73) Assignee: Inventio AGT, Hergiswil NW (CH)

( * ) Notice: Subject to any disclaimer, the term of this patent is extended or adjusted under 35 U.S.C. 154(b) by 128 days.

(21) Appl. No.: 10/373,953

(22) Filed: Feb. 26, 2003

(65) Prior Publication Data

US 2003/0168288 A1    Sep. 11, 2003

(30) Foreign Application Priority Data

Mar. 11, 2002  (EP) .................................. 02405184

(51) Int. Cl.⁷ .............................................. B66B 13/14
(52) U.S. Cl. ..................................... 187/316; 187/391
(58) Field of Search .............................. 187/247, 248, 187/313, 316, 317, 391; 49/26, 28; 318/481, 318/286, 466–470; 382/103, 104, 106, 107

(56) References Cited

U.S. PATENT DOCUMENTS

| | | | |
|---|---|---|---|
| 4,874,063 A * | 10/1989 | Taylor ......................... | 187/391 |
| 5,001,557 A | 3/1991 | Begle | |
| 5,250,765 A * | 10/1993 | Mizuno et al. ............. | 187/316 |
| 5,284,225 A * | 2/1994 | Platt ........................... | 187/316 |
| 5,387,768 A * | 2/1995 | Izard et al. .................. | 187/392 |
| 5,817,993 A * | 10/1998 | Kamani et al. ............. | 187/316 |
| 5,973,730 A | 10/1999 | Tranchita et al. | |
| 6,050,369 A | 4/2000 | Leone et al. | |
| 6,051,829 A * | 4/2000 | Full ............................ | 250/221 |
| 6,167,991 B1 * | 1/2001 | Full et al. ................... | 187/317 |
| 6,339,375 B1 * | 1/2002 | Hirata et al. ................ | 340/541 |
| 6,386,326 B2 * | 5/2002 | Pustelniak et al. .......... | 187/317 |
| 2004/0022437 A1 * | 2/2004 | Beardsley .................... | 382/199 |
| 2004/0108171 A1 * | 6/2004 | De coi ........................ | 187/316 |
| 2005/0074142 A1 * | 4/2005 | Ertl et al. .................... | 382/103 |

FOREIGN PATENT DOCUMENTS

| | | |
|---|---|---|
| EP | 0 448 803 | 10/1991 |
| EP | 0 551 175 | 7/1993 |
| EP | 1 059 621 | 12/2000 |
| WO | WO 01/42120 | 6/2001 |

OTHER PUBLICATIONS

Jeremias, Ralf et al., "A CMOS Photosensor Array for 3D Imaging Using Pulsed Laser", Tech. Digest, IEEE International Solid-State Circuits Conference (ISSCC 2001), San Francisco, CA pp. 262-3, 452.

* cited by examiner

Primary Examiner—Jonathan Salata
(74) Attorney, Agent, or Firm—Butzel Long (57) ABSTRACT

An apparatus and a method for monitoring an elevator door include a sensor for detecting three-dimensional image information. Processing equipment evaluates the image information of detected images to recognize a deviation between two images and trigger a situation-adapted reaction. The sensor includes a light source mounted in the region of the elevator door so that the elevator door is disposed at least partly in the illuminated region of the light source. In addition, the sensor includes a sensor group mounted so that it receives light reflected from the door.

17 Claims, 4 Drawing Sheets t=0

DOOR STATE MONITORING BY MEANS OF THREE-DIMENSIONAL SENSOR

BACKGROUND OF THE INVENTION

The present invention relates generally to an apparatus, a method and a software module for monitoring the state of elevator doors.

Elevator systems include at least one elevator car that is movable in an elevator shaft or freely along a transport device. The elevator car is normally closed by a car door and the elevator shaft is normally closed by a shaft door at each floor.

Mechanical, magnetic, inductive or similar switches are frequently used for monitoring the doors of an elevator system. In addition, optical systems, for example light barriers or light gratings, are used. The elevator control can be supplied with certain information—for example, about the state of the doors—by the above-identified monitoring devices. However, the information content is relatively limited, since a switch is only in a position to indicate, for example, two states (digital information whether the door is open or closed). In order to be able to build up a more complex monitoring system, there is needed, for example, a combination of several switches and light barriers.

For technical reasons, light barriers or light gratings do not function reliably with a door gap of less than 5 cm. This is a disadvantage of those kinds of solutions. In addition, the reaction time amounts to about 65 milliseconds, which in certain circumstances can be too long.

Optical systems, in particular, have certain advantages since, by contrast with mechanical solutions, they operate in a contactless manner and are not subject to any mechanical wear. Unfortunately, even with more complex optical systems such as used in the field of elevators the informational power is limited to a few states. For example, it can be detected whether anybody stands in the door region and movements can be recognized.

Certain optical photosensors even enable detection of three-dimensional images, wherein mechanically moved parts in the form of, for example, mirrors are used. These sensors are complicated and costly.

A system for monitoring elevator doors, which operates with a preprogrammed processor, a digital camera, an analog camera or a video camera, is shown in the PCT Patent Application WO 01/42120. This represents the closest state of the art. The camera delivers a sequence of two-dimensional images, through comparison of which information about the state of the doors is made available. This system operates with outside light that is captured and received by the camera. This leads to problems in situations where the intensity of this outside light changes very significantly—for example, in the case of incidence of sunlight—and thus strongly increases the image brightness. Conversely, the use of such a camera for the stated purpose can also be problematic when the outside light that is present is not sufficient. It is essential for door state monitoring that the monitoring functions safely and reliably in all circumstances. A dependence on outside light is problematic from this viewpoint. According to the above-identified PCT patent application a classic pattern recognition formulation (pattern matching) is used in order to be able to evaluate the sequence of two-dimensional images. A system operating as shown in the PCT patent application with two-dimensional images cannot make a statement about distances. A specific statement with respect to movements and movement directions is possible, in the case of such a two-dimensionally operating system, only by a calculation-intensive reprocessing of the supplied images.

Three-dimensional semiconductor sensors enabling three-dimensional detection of image information are known. Sensors of that kind are known from, for example, the article "Fast Range Imaging by CMOS Sensor Array Through Multiple Double Short Time Integration (MDSI)", P. Mengel et al., Siemens AG, Corporate Technology Department, Munich, Germany. A further example is described in the article "A CMOS Photosensor Array for 3D Imaging Using Pulsed Lasers", R. Jeremias et al., 2001 IEEE International Solid-State Circuits Conference, page 252.

SUMMARY OF THE INVENTION

The present invention concerns an apparatus for monitoring states of an elevator door comprising: a sensor for generating distance information and including a light source and a sensor group responsive to light emitted by said light source for generating three-dimensional distance information; and processing equipment connected to said sensor and being responsive to said distance information for recognizing a deviation of said distance information from reference information whereby when said sensor is mounted in a region of an elevator door which is to be monitored with the door disposed at least partly in a detection range illuminated by said light source, said processing equipment can categorize at least one state of the elevator door based upon said deviation.

The present invention also concerns a A method of monitoring a state of an elevator door wherein light reflected from a region of the door is detected by a sensor comprising the steps of: a) ascertaining three-dimensional image information related to at least one of a transit time and phase position of the reflected light; b) evaluating the three-dimensional image information for recognition of a door state; c) categorizing the door state; and d) triggering a situation-adapted reaction based upon the categorized door state.

The present invention further concerns a A software module for use in processing equipment of a elevator comprising: means for evaluating three-dimensional image information provided by a three-dimensional sensor in a region of an elevator door to recognize a state of the elevator door; means for categorizing the recognized door state; and means for triggering a situation-adapted reaction based upon the categorized door state.

It is an object of the apparatus and the method according to the present invention to enable a comprehensive, accurate and reliable checking of doors, particularly of the state of the doors of an elevator.

It is a further object of the apparatus and the method according to the present invention to realize a reliable and quick-action protection, against being caught, for elevator doors.

According to the present invention these objects are met in advantageous manner by an apparatus, a method and a software module as described in more detail below.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

According to the present invention there is used, for the first time in the realm of elevators, a novel optical three-dimensional sensor. The sensor is in that case preferably a three-dimensional sensor operating in the infrared range. A three-dimensional sensor comprising an optical transmitter for pulse-shaped transmission of light and a complementary metal oxide semiconductor sensor group for detection of light is particularly suitable. Ideally, the optical transmitter is a luminescent diode or a laser diode that transmits, for example, light in the infrared range, wherein the light is emitted in short pulses, i.e. in a quasi-flashing manner. The pulses can be of a length of several tens of nanoseconds. The diode is for this purpose preferably provided with a (electric) shutter that interrupts the emitted light. The diode can, however, also be directly pulsed. The sensor group serves as an image sensor converting light into electrical signals. The sensor group preferably consists of a number of light-sensitive elements. The sensor group is connected with a processing chip (for example a CMOS or complementary metal oxide semiconductor sensor chip), which determines the transit time of the emitted light in that a special integration procedure (multiple double short-time integration, termed MDSI) is carried out. In that case the processing chip simultaneously measures in a few milliseconds the distance to a large number of target points in space. In that case, depending on the respective number of light-sensitive elements, a spatial resolution of 5 mm can typically be achieved.

A further three-dimensional sensor, which apart from other three-dimensional sensors is also suitable for use in connection with the present invention, is based on a distance measuring principle in which the transit time of transmitted light is detected over the phase of the light. In that case the phase position at the time of transmission of the light and at the time of reception is compared and the elapsed time or the spacing from the reflecting object is ascertained therefrom. For that purpose a modulated light signal is preferably emitted instead of short light pulses.

In order to suppress the influences of outside light, a double scanning can be undertaken in which scanning is once with and once without light. In that case there are obtained two electrical signals (once with active illumination, once without) able to be converted into a final signal, which is substantially independent of stray light, by subtraction. Such a sensor can even be reliably used in the case of solar radiation and in the case of changing light influences.

The three-dimensional sensor is preferably constructed from semiconductor components, which leads to a high degree of reliability and robustness. In addition, such a three-dimensional sensor is particularly small and can be made advantageously producible by mass production.

Through the detection of three dimensions there can be realized a device which directly detects the positions of objects, the distances between these objects and even the movements and movement directions thereof. For this purpose processing equipment can be used (for example, a personal computer or a central processing unit with peripheral components) which executes three-dimensional mathematical operations. This form of three-dimensional mathematical operations substantially differs from the previously employed special pattern recognition formulations that operate with, for example, different gray steps.

Figure 1A:
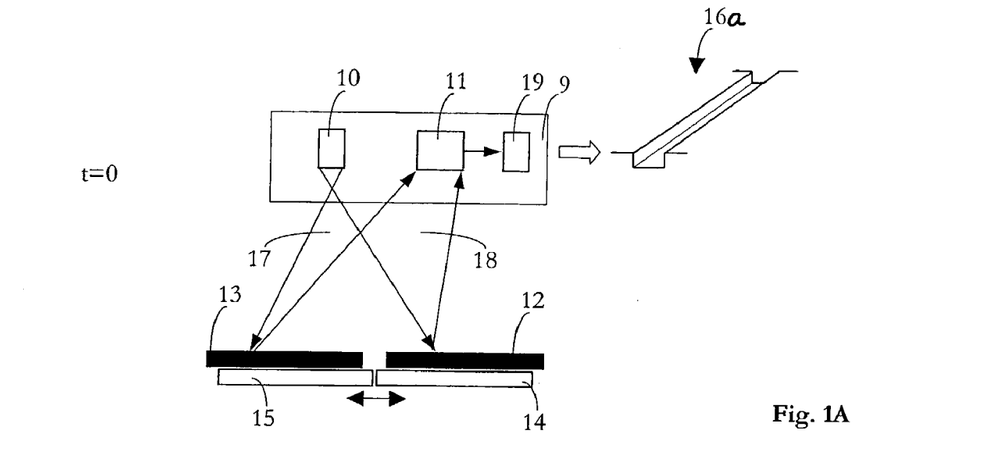
FIGS. 1A and 1B are schematic top plan views of the doors of an elevator with a sensor according to the present invention showing the shaft doors closed and the car doors partially open and closed respectively.

A first embodiment of a device according to the present invention is shown in FIG. 1A. This is a device for simultaneous monitoring of a pair of car doors 12 and 13 and a cooperating pair of shaft doors 14 and 15 of an elevator (the elevator itself is not shown in FIG. 1A). The device includes a three-dimensional semiconductor sensor 9 that is mounted in the region of the doors 12 through 15, which are to be monitored, in such a manner that the doors 12 through 15 are disposed at least partly in a detection range of the sensor 9. The sensor includes a laser diode that serves as a light source and transmits an intrinsic light component. An illuminated region, for example in the form of a light cone 17 and a light cone 18, results in dependence on the respective optical beam shape. A sensor group 11 is provided, which serves as an image sensor and which receives light information by way of the light cones 17 and 18 and converts it into electrical signals. The light information is prepared by a processing chip 19 and converted into image information (for example, in the form of a three-dimensional distance image). An example of such a three-dimensional distance image 16a, taken at time "t=0", is illustrated in considerably simplified form in FIG. 1A. It can be inferred from the distance image 16a that a gap exists in the door region, wherein the shaft doors 14 and 15 are closed and the car doors 12 and 13 are slightly open.

Figure 1B:
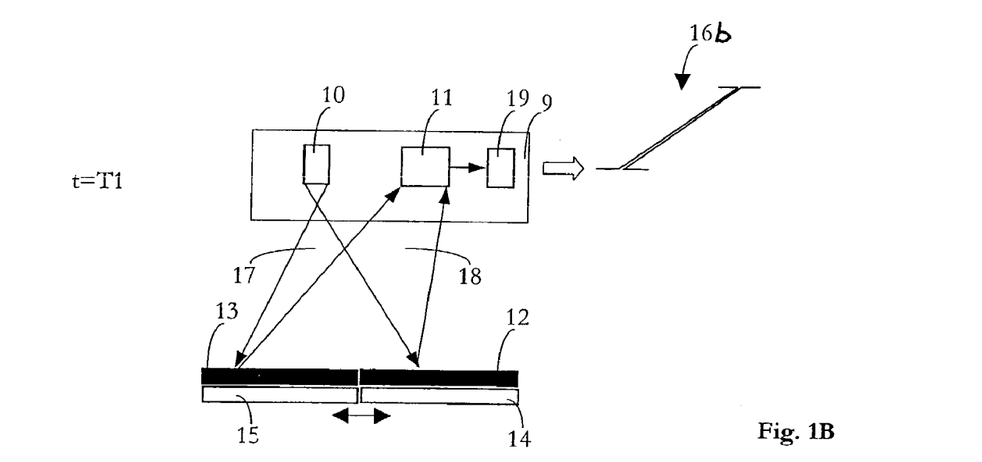

If the detection process is repeated after a short interval in time, at time "t=T1", a distance image 16b as shown in FIG. 1B results. The door gap between the two car doors 12 and 13 has almost closed. The distance image 16b therefore shows only a very narrow gap. The repetition of the detection process preferably coincides with the short-time integration time window of the three-dimensional sensor. The width "T1" of the time window can correspond with the repetition frequency of the light pulses transmitted by the light source 10.

The instant in time at which a laser pulse is transmitted in the direction of the doors 12 through 15 is preferably synchronized with respect to the start of an integration window. A laser pulse received by the sensor group 11 after reflection at the doors 12 through 15 triggers, after a transit time "T0", a linearly rising sensor signal X(t) which, for example, can be measured at two different integration instants "T2" and "T3" (wherein T0<T2<T3). Depending on the distance of the light source 10 from the doors 12 through 15 and from there to the sensor group 11, only a fraction of the original intensity of the light pulse is detected while the integration time window "T2" to "T3" is active. To the extent that two integration measurements are made at different times "T2" and "T3", the position and gradient of the intensity signal X(t) increasing from the time instant "T0" can be ascertained. For example, the transit time "T0" can be accurately determined and thus also the spacing of the doors 12 through 15 from the position and gradient. An evaluation of that kind of light information by the processing chip 19 makes it possible to obtain information not instantaneously obtainable in any other mode and manner.

A part of this light information processing takes place in the processing chip 19 and not just in separate processing equipment. This means that a part of the processing is carried out by corresponding hardware that is reliable and fast acting.

Two different processing expressions are usable. In the case of the first expression according to the present invention, a sensor group "n" comprises light-sensitive elements (n>0). Each of these light-sensitive elements delivers an intensity signal $x_n(t)$, the strength of which is dependent on the intensity of the light received by the respective light-sensitive element. These intensity signals $x_n(t)$ can be combined—for example by a form of superimposition—into intensity signals X(t). After this combining, the above-described evaluation can be carried out, in which the time instant "T0" is ascertained from the position and gradient of the intensity signal X(t). In this form of embodiment the area resolution of the arrangement is reduced, since several light-sensitive elements are evaluated in common. It is nonetheless possible to ascertain the transit time and thus the distance to the doors. There is thus obtained a three-dimensionally operating sensor device, the depth resolution of which is better than the area resolution.

In the case of the second expression according to the present invention, the sensor group again comprises "n" light-sensitive elements (n>0). Each of these light-sensitive elements delivers an intensity $x_n(t)$, the strength of which is dependent on the intensity of the light received by the respective light-sensitive element. These intensity signals $x_n(t)$ can then run through the above-described evaluation, wherein each of the intensity signals $x_n(t)$ is processed individually (preferably at the same time). The respective time instant "$T_n0$" is ascertainable from the position and gradient of each of the intensity signals $x_n(t)$. The processing chip preferably has several parallel channels (preferably "n" channels) for processing the "n" intensity signals $x_n(t)$. An area resolution results with this form of embodiment, since several points in space can be detected independently from one another (for example, several points of the doors). It is possible to ascertain the transit time "$T_n0$" and thus the distance for each of these points in space. There is thus obtained a three-dimensionally operating sensor device with depth resolution and area resolution.

Figure 2:
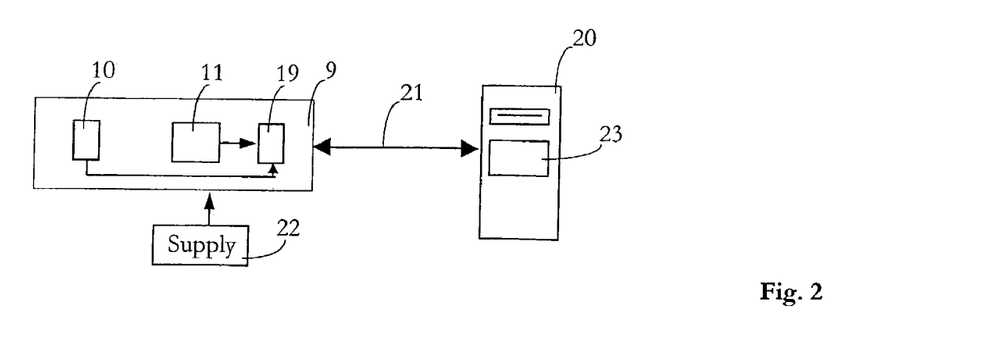
FIG. 2 is a schematic block diagram of the sensor according to the present invention with processing equipment.

As shown in FIG. 2, the device according to the present invention additionally includes processing equipment 20 which, for example, is connected with the sensor 9 by way of a communications connection 21. The communications connection 21 serves for transfer of image information (also termed state information) from the sensor 9 to the processing equipment 20. In addition, the device includes a current supply means 22 (for example, a voltage source) for supply of the sensor 9 with current. The processing equipment 20 is designed in such a manner through installation of the software module that the image information can be evaluated in order to enable monitoring of the elevator doors 12 through 15.

In one possible embodiment, the image information is further evaluated by the processing equipment 20 in order to obtain information about the door state. For that purpose, for example, the state information obtained from the image information can be compared with target information. For this purpose the processing equipment 20 can include means 23 for providing the target information. In that case such means can be, for example, an internal fixed-disc memory. It is possible, for example, that the distance image 16b shown in FIG. 1B is stored in the fixed-disc memory as target information. The processing equipment 20 can ascertain by a comparison algorithm whether the state information corresponds with the target information. In this case it can be assumed that the doors 12 through 15 are closed. Other target information, with which the processing equipment 20 undertakes respective comparisons, can also be predetermined. A specific reaction can, for example, be associated with each item of target information.

Figure 3A:
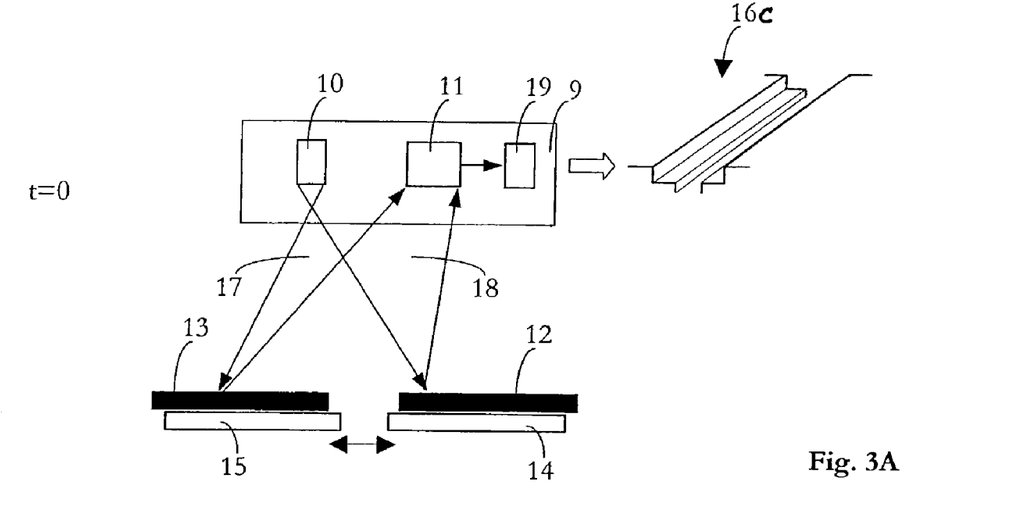
FIGS. 3A and 3B are views similar to FIGS. 1A and 1B with the shaft and car doors partially open with and without an object in the door gap respectively.
Figure 3B:
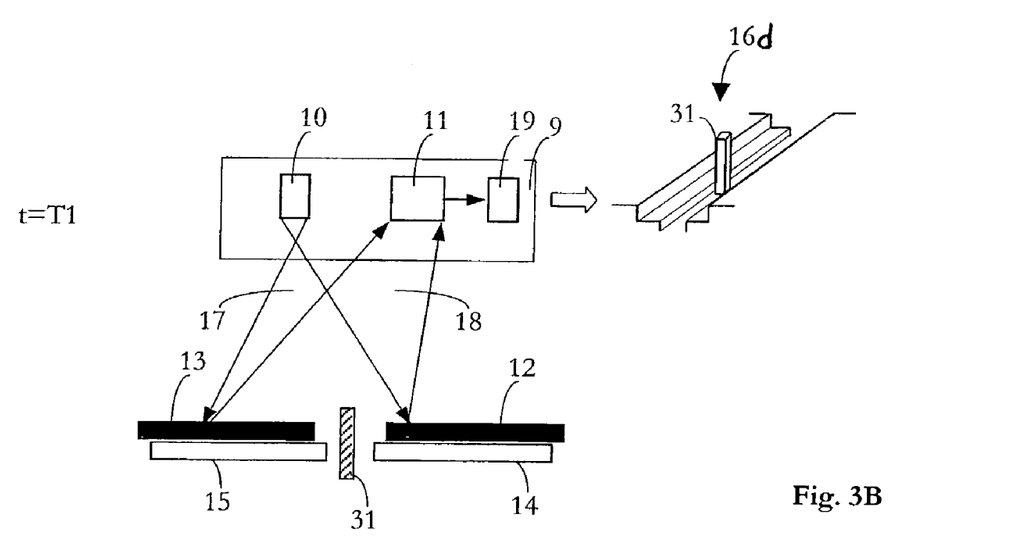

In another embodiment the image information is preprocessed at the hardware side by the processing chip 19 and then evaluated by the processing equipment 20 without comparing the state information with target information. In that case, image data, which were detected by the sensor 9 at at least two time instants following one another at a short interval, are compared with one another. Such a comparison can be carried out, for example, by appropriate computerized superimposition of the image information. If the image information at the time instant "t=0" is subtracted from the image information at the time instant "t=T1", the processing equipment 20 can then recognize changes in the three-dimensional space. Details with respect to this form of embodiment can be inferred from FIGS. 3A and 3B. In FIG. 3A there is shown a situation in which not only the car doors 12 and 13, but also the shaft doors 14 and 15 are open to some extent at the time instant "t=0". At the time instant "t=T1" (see FIG. 3B), an object 31 is disposed in the door gap. A distance image 16d shown in FIG. 3B shows in strongly schematic form that the object 31 was detected. The object 31 can be clearly detected by a superimposition of the two distance images 16c (FIG. 3A) and 16d, since there is obtained through the superimposition, for example, a three-dimensional height profile which substantially corresponds with the shape of the object. The penetration of the object 31 leads to a recognizable change in the height profile. As soon as an object has been detected in the region of the doors 12 through 15, the processing equipment 20 can trigger a corresponding reaction. The reaction can consist of, for example, interrupting the closing of the doors 12 through 15 so as to prevent the object 31 from being caught by the doors. Alternatively, the closing movement can be stopped and the doors reopened.

This form of embodiment can be extended in that the processing equipment 20 is so designed at the software side that it can not only be recognized whether an object is disposed in the door region, but the object can also be classified by comparison operations.

The embodiment shown in FIGS. 3A and 3B can be extended in that the processing equipment 20 is supplied with a sequence of several images succeeding in time. In this case the processing equipment 20 can, through suitable processing of the image information, also ascertain the movement direction and/or speed of the object 31 in addition to pure detection of the object 31. This movement information can be used for triggering situation-adapted reactions. If the processing equipment 20 determines that the object moves slowly, then the closing of the doors 12 through 15 can be interrupted or the closing movement stopped. If the object 31 is one that moves quickly, it can be sufficient, for example, to slow down the closing movement of the doors or to interrupt this only for a short moment. It is conceivable as a further reaction to trigger an announcement in order to ensure that nobody stands in the door region.

As shown in FIGS. 1A, 1B, 3A and 3B, the device according to the present invention can be used for simultaneous monitoring of the car doors and the shaft doors.

Figure 4A:
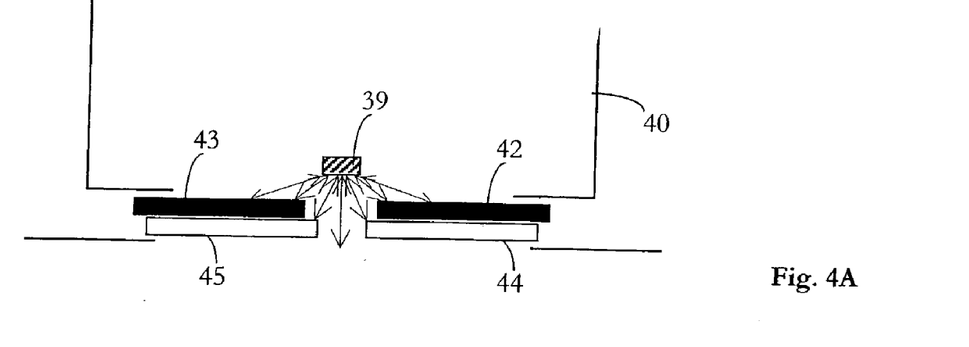
FIG. 4A is a schematic top plan view of a part of an elevator with a sensor according to the present invention.
Figure 4B:
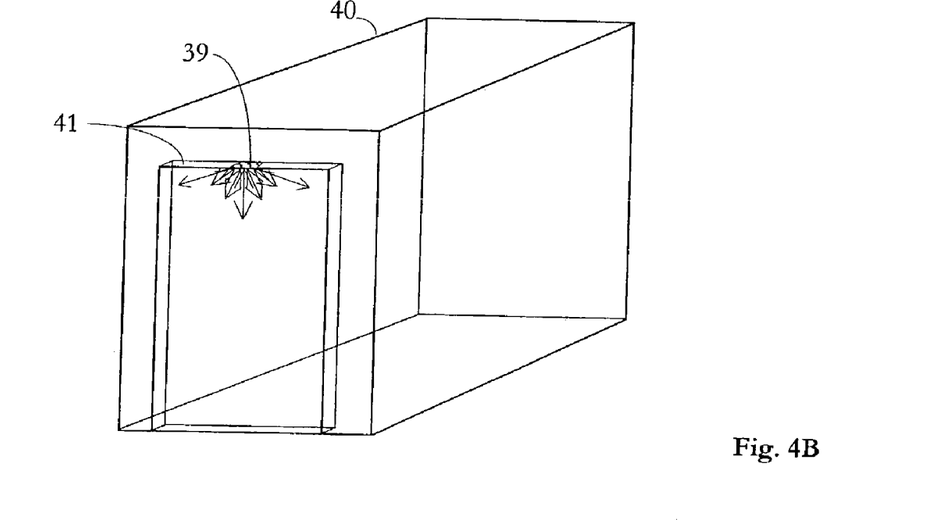
FIG. 4B is a schematic perspective view of the elevator car with the sensor shown in FIG. 4A.

If in the first instance it is desired to monitor a pair of car doors 42 and 43, a sensor 39 according to the present invention can then be mounted in the region of a car door cross member 41 as can be recognized, schematically, in FIG. 4A (plan view) and FIG. 4B (perspective view). The car door cross member 41 is disposed in the upper region of an elevator car 40. It can be recognized in FIG. 4A that in the case of this form of configuration primarily the car doors 42 and 43 can be monitored. Since, however, the shaft doors 44 and 45 follow, with an offset, the movement of the car doors 42 and 43, a particular statement about the closing and opening of the shaft doors 44 and 45 can also be made. In the case of the configuration shown in FIGS. 4A and 4B, the sensor 39 moves from floor to floor with the elevator car 40. The shaft doors of the individual floors cannot be monitored by the sensor 39 in the case of absence of the car 40. It is recommended to use monitoring means, for example conventional constrainedly opening contacts, on each floor at the shaft door side.

Figure 5:
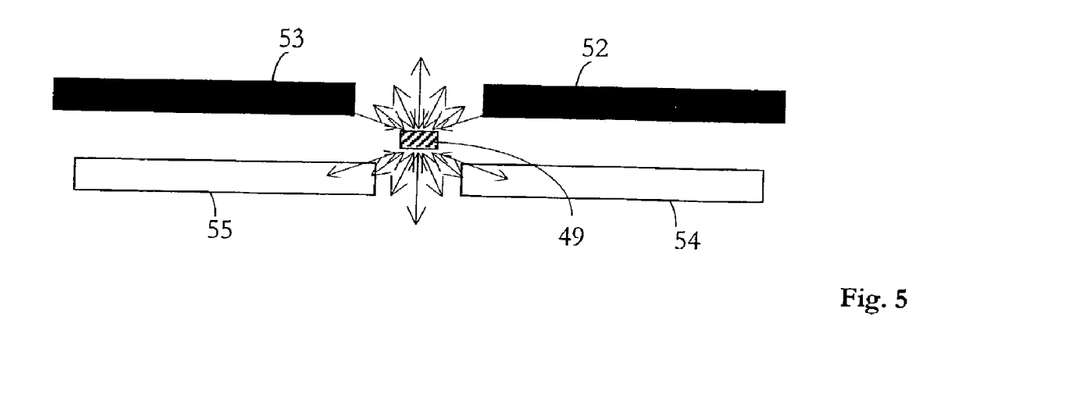
FIG. 5 shows a schematic top plan view of the doors of an elevator with a sensor according to the present invention.

For simultaneous monitoring of a pair of car doors 52 and 53 and a pair of shaft doors 54 and 55, a sensor 49 can be arranged between the car doors and shaft doors in the region of the cross member, as indicated in FIG. 5. In that case the light source of the sensor 49 should be oriented so that it transmits light in the direction of the car doors 52 and 53 and the shaft doors 54 and 55. The sensor group of the sensor 49 should be so oriented with respect to the light source that it catches light which was reflected by the car doors 52 and 53 and by the shaft doors 54 and 55.

In general it should be noted in the case of mounting the sensor that the sensor itself should, as far as possible, be incapable of being influenced by external influences (objects and/or persons, weather, mechanical damage, etc.). In the case of center opening doors, such as shown in FIGS. 1A, 1B, 3A, 3B, 4 and 5, the sensor is preferably arranged centrally with respect to the door. In the case of telescopic doors closing from one side or in the case of doors closing from above to below—for example in freight elevators—or in another mode and manner, the sensor can also be arranged differently.

Figure 6:
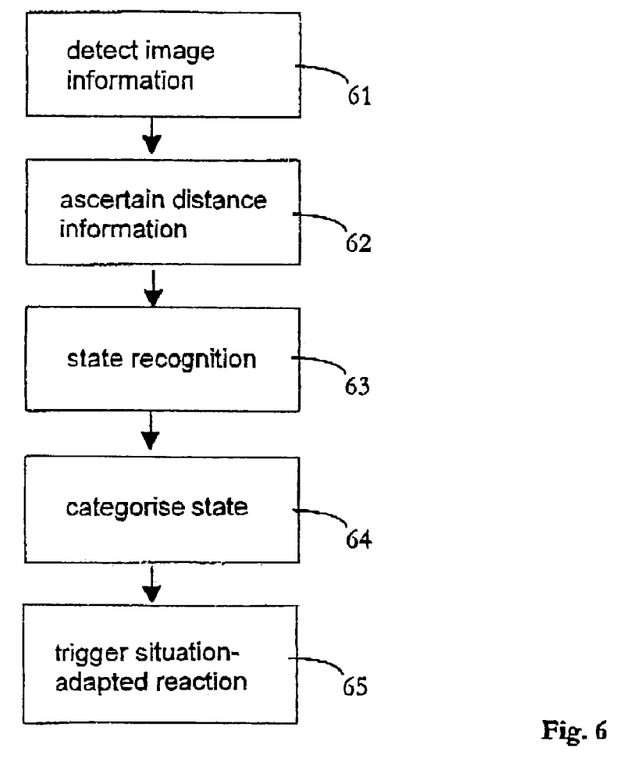
FIG. 6 is a flow chart of a method according to the present invention.

A method according to the invention for monitoring the state of an elevator door includes several method steps. Light, which was reflected at various points in space in the environment of the door to be monitored, is detected by a sensor (for example, sensor 9 in FIG. 1A) in a step 61 shown in FIG. 6. This light originates from a light source (for example, the light source 10 in FIG. 1A). Distance information is ascertained from the detected light (step 62). In that case, the transit time of the light is taken into consideration. In order to make this possible, a synchronization between the light source and the sensor group takes place. This step is preferably undertaken in a special processing chip (for example, the chip 19 in FIG. 1A). The evaluation of the distance information (step 63) is then carried out for recognition of a door state. Preferably, this step is performed in the processing equipment 20, wherein an appropriate software module comes into use. Three-dimensional mathematical operations preferably come into use in the evaluation of the distance information. The processing equipment 20 categorizes the state into one or more known states (step 64). The method according to the present invention can be designed so that at least one of the following states is recognizable:

door gap,
    position of the elevator door or doors,
    closing behavior of the elevator door or doors and
    object in the region of the elevator door or doors.

A situation-adapted reaction is then triggered by the processing equipment in dependence on the recognized state (step 65).

In that case, these can be one or more of the following reactions:

stop door closing process,
    stop door opening process,
    slow down door closing process,
    slow down door opening process,
    trigger loudspeaker announcement,
    place a service call,
    trigger an emergency call,
    stop elevator operation,
    continue elevator operation at reduced speed,
    initiate evacuation of the elevator car,
    etc.

Figure 7:
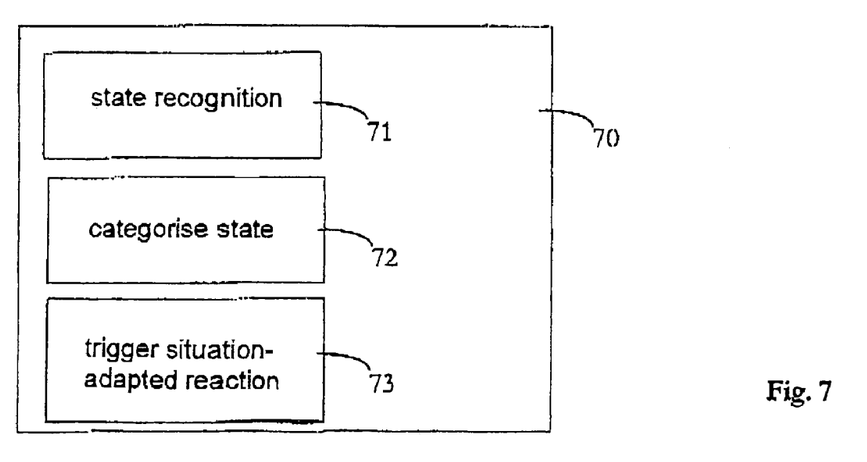
FIG. 7 is a schematic block diagram of a software module according to the present invention.

A software module 70 according to the present invention for use in the processing equipment 20 of an elevator is shown in FIG. 7. The software module 70 performs the following steps when it is called up and executed by the processing equipment:

evaluation of distance information (submodule 71), which is provided by a three-dimensional sensor in the region of a elevator door, in order to detect the state of the elevator door,
    categorization (submodule 72) of the state and
    triggering (submodule 73) a situation-adapted reaction.

The software module 70 can include further modules.

The light source 10 and the sensor group 11 are preferably arranged in a housing to facilitate the mounting in or at the elevator, since the light source does not have to be manually aligned with respect to the sensor group. The alignment of the two components can be carried out during production or pre-assembly.

For shaft door monitoring it is recommended to provide a sensor in the region of the shaft door on every floor. Such a configuration is relatively expensive in terms of cost, since one sensor is used per floor. More favorable is a configuration in which there is used a sensor moving from floor to floor with the elevator car.

In a further embodiment the processing equipment 20 compares the image information with one or more reference images in order to obtain information about the door state. For this purpose, for example, a reference image can be subtracted from the image information. According to an improved embodiment the door state monitoring is carried out continuously by a succession of numerous light pulses and processing thereof. Safety of elevators can thereby be increased in comparison with conventional, mechanical attachments.

The door monitoring according to the present invention is suitable for detecting the door state (door position, door gap, course of the closing movement, etc.).

If a conventional communications connection for connecting the sensor with the processing equipment is used, then, due to the safety relevance of the data (image information) transferred by the sensor to the processing equipment, suitable measures are undertaken in order to ensure safety in the transmission of data by way of the communications connection, which is not itself inherently secure.

The device according to the present invention can be connected by way of a communications connection and/or by way of a network with a computer that further processes, prepares and optionally stores the image information delivered by the sensor. Thus, a monitoring system can be realized which, for example, monitors an elevator installation with several elevator shafts.

Preferably a device according to the present invention is integrated in the safety circuit of an elevator. The safety circuit thereby has greater performance capability and the elevator is more reliable. As a consequence, in certain circumstances the serviceability of the elevator can thereby improve. With a suitable design of the device according to the present invention, operating disturbances can be reduced, whereby the trapping of persons in the elevator car occurs more rarely. Operational disturbances of that kind can be caused in conventional elevators by faultily functioning locking mechanisms, by contact problems at door locking check switches or by contaminations.

An advantageous development of the device and method according to the present invention enables extension of the door state monitoring so that protection against being pinned can be realized.

The protection, in accordance with the device and method according to the present invention, against being pinned allows a person to be detected in good time and an appropriate reaction to be triggered in order, for example, to reduce the risk of being pinned in the door region.

It is an advantage of the device and method according to the present invention that neither the door state monitoring nor the protection against being pinned requires sensors and other means in or at the doors. Thus, the necessity of providing cable feeds in the door region is redundant.

A further advantage of a solution according to the present invention by means of a three-dimensional sensor is to be seen in that sensors of that kind have a relatively short cycle time (<20 ms). Very rapid monitoring solutions can thus be realized. Critical states can be detected more quickly and reactions triggered at the appropriate time. The invention enables realization of monitoring systems that have a reaction time to recognition of objects of just a few milliseconds. The rapid recognition makes it possible to very rapidly trigger a suitable reaction and, in particular and in contrast to known systems, before any contact between the doors and the detected object comes about.

The three-dimensional sensors employed enable evaluation of the third dimension, which is advantageous by comparison with one-dimensional systems (for example, light barriers) or two-dimensional systems (for example, light gratings or charge-coupled-device cameras). By virtue of detection of three dimensions the door state monitoring or the protection against pinning can be furnished in direct mode and manner with a reality-proximal image of the actual state of the door region.

It is an advantage of the semiconductor sensor used that this operates with an intrinsic light component. Thus, the system is substantially independent of environmental conditions and even functions in the dark. As a further advantage it can be put forward that the device and method according to the present invention can be realized without a calibrating mechanism, which usually has to be used in the case of camera-based systems in order to take account of changed environmental conditions. In the case of a camera-based system, for example, the light sensitivity is adjusted by a calibrating mechanism. This complication is eliminated.

A further embodiment of the device and method according to the present invention is distinguished by the fact that the processing equipment is designed so that image information can be stored. It is thus possible to document a critical process, for example the catching of a person when entering or leaving the elevator car, by means of image information. Image information of that kind can serve, for example, for safety evidence.

In a further embodiment of the device and method according to the present invention a safety call is triggered, as a reaction, as soon as a detected door gap exceeds a minimum dimension, wherein in the case of a sub-critical door gap the operation of the elevator is not interrupted. The elevator is stopped only in the case of exceeding a critical value. In addition, an emergency call can possibly be placed.

Advantageously the evaluation of the image information delivered by the three-dimensional sensor can be linked with the door drive so as to enable synchronization of the information processing. For this purpose the door drive can be equipped with an encoder. The information delivered by the door drive by way of the encoder to the processing equipment can be used in the comparison of the actual information with the target information.

In the case of an elevator with wide doors, several sensors can be used, which are connected either with processing equipment or with several items of processing equipment.

The door monitoring according to the device and method according to the present invention can either replace the conventional monitoring of door locking or be used to complement monitoring of door locking. The safety of the overall system can thus be improved.

The device and method according to the present invention can, with respect to door monitoring, also be combined with the control of an elevator that controls the door setting. Thus, a regulating circuit can be built that triggers an appropriately matched reaction in dependence on the respective door state.

The inventive concept can be extended in that the sensor is used not only for monitoring elevator doors, but also for room monitoring. In that case, with appropriate arrangement of the sensor it is possible to monitor, for example, the interior space of the car or the foreground space in front of the car.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for monitoring states of an elevator door comprising:

a sensor for generating three-dimensional image information and including a light source and a sensor group, said sensor group including a plurality of light-sensitive elements detecting light emitted by said light source and reflected by a plurality of target points in a monitored space, a transit time of each of said emitted light pulses representing an associated distance between said sensor and an associated one of the target points, said distances forming said three-dimensional image information; and processing equipment connected to said sensor and being responsive to said three-dimensional image information for recognizing a deviation of said three-dimensional image information from reference information whereby when said sensor is mounted in a region of an elevator door which is to be monitored with the door disposed at least partly in a detection range illuminated by said light source, said processing equipment can categorize at least one state of the elevator door based upon said deviation.

2. The apparatus according to claim 1 including means for storing target information as said reference information and wherein said processing equipment compares said three-dimensional image information with said target information to recognize said deviation and categorize said at least one state of the elevator door.

3. The apparatus according to claim 1 wherein said three-dimensional image information and said reference information are images detected successively in time said the sensor group.

4. The apparatus according to claim 1 wherein said light source emits said light as light pulses.

5. The apparatus according claim 1 wherein said processing equipment triggers a one of a plurality of reactions in dependence on the kind of said recognized deviation.

6. The apparatus according to claim 5 wherein said processing equipment triggers said one reaction when said recognized deviation exceeds a threshold value.

7. The apparatus according to claim 5 wherein said processing equipment triggers said one reaction when said recognized deviation equates to a recognition pattern.

8. The apparatus according claim 1 wherein said sensor is adapted for mounting in a region of a cross member of an elevator car door.

9. The apparatus according to claim 1 wherein said processing equipment recognizes said deviation based upon three-dimensional mathematical operations.

10. The apparatus according to claim 9 wherein said three-dimensional mathematical operations include an integration procedure.

11. The apparatus according claim 1 wherein said light source radiates said light in an infrared range and is one of a luminescent diode and a laser diode.

12. The apparatus according to claim 1 wherein said sensor group is an image sensor connected to a complementary metal oxide semiconductor processing chip.

13. The apparatus according to claim 1 wherein said sensor generates said distance information as a double scan, one scan with said light and one scan without said light, for reducing an influences of outside light.

14. A method of monitoring a state of an elevator door wherein light reflected from a region of the door is detected by a sensor comprising the steps of:
 a. ascertaining three-dimensional image information related to at least one of a transit time and phase position of the reflected light;
 b. evaluating the three-dimensional image information for recognition of a door state;
 c. categorizing the door state; and
 d. triggering a situation-adapted reaction based upon the categorized door state.

15. The method according to claim 14 wherein said step b. is performed by basing the evaluation of the three-dimensional image information upon three-dimensional mathematical operations.

16. The method according to claim 15 wherein said step b. is preformed by recognizing at least one of a door gap width, a position of the elevator door, a closing behavior of the elevator door and an object in the region of the elevator door as a door state.

17. An apparatus for monitoring states of an elevator door comprising:
 a sensor for generating distance information and including a light source and a sensor group responsive to light emitted by said light source for generating three-dimensional distance information, wherein said sensor generates said distance information as a double scan, one scan with said light and one scan without said light for reducing an influences of outside light; and
 processing equipment connected to said sensor and being responsive to said distance information for recognizing a deviation of said distance information from reference information whereby when said sensor is mounted in a region of an elevator door which is to be monitored with the door disposed at least partly in a detection range illuminated by said light source, said processing equipment can categorize at least one state of the elevator door based upon said deviation.

* * * * *